Figure 2:
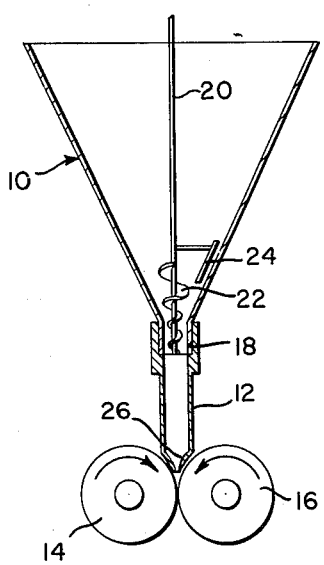

May 15, 1962

W. J. KING 3,034,848

COMPACTION OF DYES

Filed April 14, 1959

INVENTOR
WILLIAM J. KING

BY *Edwin C. Woodhouse*

ATTORNEY

United States Patent Office 3,034,848
Patented May 15, 1962

3,034,848
COMPACTION OF DYES
William J. King, Wilmington, Del., assignor to E. I. du Pont de Nemours and Company, Wilmington, Del., a corporation of Delaware
Filed Apr. 14, 1959, Ser. No. 806,387
11 Claims. (Cl. 8—79)

This invention relates to the compaction of dyes that are used for coloring gasoline and more particularly to the conversion of a certain limited class of dusty dye powders into free-flowing, non-dusting particles which have a high rate of solubility in gasoline.

In coloring gasoline with oil-soluble dyes, it is a common practice at oil refineries to transfer the dye through a pipe or hose from the shipping container to a tank holding the gasoline or a solvent. A solvent, such as isooctane, is sometimes used to make a concentrated solution of the dye. For a continuous even flow of the dye through a tube, the dye must be a dry, powdery, or fine granular material. A free-flowing finely subdivided dye also has the advantage of quickly dissolving in gasoline or a solvent without requiring prolonged stirring and causing undue delay before the solution can be used. A too finely subdivided material, however, with a particle size that will enable it to pass, for example, a 200-mesh screen, dusts badly. The dust gets loose in the air, creates a health hazard, and settles on floors, walls, and equipment. The skin and clothing of those who handle the dye become stained and contaminated. Because the dye is insoluble in water, hosing, washing, and scrubbing with water only partially remove it. When a solvent is used to clean off the dye, a toxicity or fire hazard may be encountered. Thus, contamination by dye dust is troublesome, and dye that escapes as dust is a loss of valuable material. Loss of material and contamination by the dye are much reduced by handling the dye in containers that are kept closed as much as possible, but, even with the precautions the users of gasoline dyes may take to keep the dye confined, some of the fine dusty powder of the dye gets loose and is objectionable.

It has been proposed to convert, by compaction, a wide variety of finely-divided powders into particles of larger size having advantages for many purposes. As far as is known, such process has not been proposed or used successfully in the treatment of dyes. No particular combination of conditions is known which will be effective for all powders or even for any substantial number thereof, but each material must be evaluated separately by exhaustive tests. The critical conditions of roll speed, surface temperature, compaction pressure, and pretreatment of the material must be determined experimentally for each material, even by one skilled in the art. If any of such items is neglected the process becomes unsuccessful. It has now been found that the same difficulties are involved in the compaction of dyes, different dyes requiring different conditions and no conditions being known today for successfully compacting many dyes.

It is an object of this invention to provide a novel process for converting a particular dye that consists of a mixture of 1-(arylazoarylazo)-2-naphthols from an obnoxious dusting fine powder into non-dusting, free-flowing granules which dissolve in gasoline at a practically acceptable rate or in a solvent which is miscible with gasoline and suitable for preparing concentrated dye solutions to be added to gasolines. Another object is to provide such a process which is easy and economical to operate and which produces the desired product in high yield and at a high rate. A further object is to provide as a new product, the particular dye in the form of non-dusting, free-flowing particles which will dissolve in gasoline at an acceptable high rate.

The above and other object may be accomplished in accordance with this invention which comprises the process of compacting a dye which consists of a mixture of disazo compounds of the formula

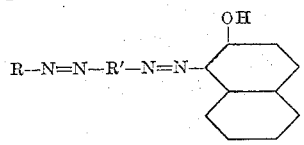

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises compressing the dry dye powder to deaerate it and reduce its bulk volume, feeding said dye powder in its compressed and deaerated form into the nip of a pair of compacting rolls which are rotated at a peripheral speed of 0.5 to 1 foot per second, and passing the dye powder between said compacting rolls while subjecting it to a compacting pressure between 1,000 and 50,000 pounds per square inch (p.s.i.) and while maintaining the surfaces of the rolls at a temperature of from about −10° C. to 30° C. The resulting compacted dye is in the form of large flakes which are then comminuted to particles which predominate in particles of sizes of 10 to 100 mesh and those particles which have a size between 10 and 100 mesh are separated from the comminuted material. There is thereby obtained a dye which consists of a mixture of disazo compounds of the formula

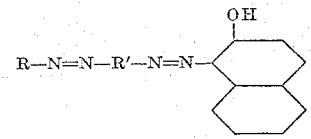

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which dye is in the form of non-dusting, free-flowing, compacted particles which have a particle size of between 10 and 100 mesh and which have a rate of solution in gasoline of at least 90% of a 200 mg. portion in 200 ml. of gasoline at 27° C. within 1400 seconds.

It has been found that the particular combination of temperature, compaction pressure, peripheral speed of the rolls and the preliminary compression and deaeration of the dye powder are critical for the aforesaid dye. When any one of the conditions is varied outside of the limits recited, the product is defective, the efficiency of the process is reduced or the process becomes inoperative. The new free-flowing, non-dusting granular dye obtained by the process of this invention fills the need for a material that avoids the troublesome dusting property of a powdery product and still provides a dye that dissolves in gasoline or a solvent at an acceptable rate. The compaction of the dye also reduces its bulk and conserves package and storage space. The physical method of the invention for compacting the dye and rendering it dustless avoids introducing foreign materials, such as waxes, resins, clays, and the like, which are non-volatile and not desirable in gasoline that is to be vaporized in a carburetor.

The dye, which is to be treated by the process of this invention, is a mixture of disazo compounds of the formula

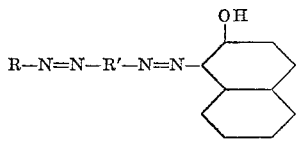

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals. Such dye is made by the process described by Friedrich and Smith in Patent 2,087,282, particularly as exemplified in Example I thereof. This dye is sold as "Du Pont Oil Red." It is normally in the form of a finely-divided, bulky aerated powder in which the particles are materially less than 100 mesh in size and have an extreme tendency to dust. A representative, closely related dye (1-phenylazo-2-naphthol) does not require the narrow range of conditions of this invention. Compaction tests of a series of water-soluble dyes were not successful in producing non-dusting products.

It is essential to first compress the dry dye powder of this invention to deaerate it and reduce its bulk volume and to feed the dye powder in its compressed and deaerated state into the nip of the compacting rolls. Otherwise, the dye powder will merely fall between the rolls and be discharged in the powdery state in which it is fed to the rolls. The compression should be sufficient to reduce the bulk volume of the aerated dye powder by at least 33%. The compression and deaeration is accomplished by feeding the dry dye powder through a forced feed mechanism which exerts a mechanical compressing force upon the dye powder to deaerate it and which forces the deaerated powder into the nip of the compacting rolls. Such feed mechanism preferably is a vertical screw type feeder. However, other types of mechanical forced feed mechanisms may be used, such as a ram or piston type feeder in which a piston compresses the aerated dye powder to remove the air and to force the deaerated material into the nip of the compaction rolls. In such feeders, the screw may be rotated by hand or by a motor or other mechanical system, and the piston may be operated by hand or by an air, hydraulic or mechanical system. Forced feeders of these types are well known to the art.

The design, size, and relative speeds of the two compacting rolls may be widely varied, within the limits set forth herein. Both rolls may be smooth, one roll may be smooth and one corrugated, or preferably, both rolls will be corrugated. The corrugations on the rolls may extend longitudinally or circumferentially of the rolls. When both rolls are corrugated and the corrugations run longitudinally of the rolls, the rolls should be rotated at the same speed. With rolls having circumferential corrugations, with two smooth rolls, and with one smooth roll and one corrugated roll, the roll speeds may be the same or they may be operated with a differential speed. When both rolls are corrugated, they preferably will be meshed, that is, the lands of each roll will operate in the valleys of the other roll. Preferably, both rolls will have circumferentially extending meshed corrugations.

It is essential that the compacting rolls be rotated at a peripheral speed of 0.5 to 1 foot per second. A peripheral speed of 1 foot per second must not be exceeded if the dye is to be compacted and rendered satisfactorily dustless and free-flowing and the process is to operate efficiently. As the peripheral roll speed is increased above 1 foot per second, the amount of compaction attained per pass of the dye through the rolls decreases rapidly and a speed is soon reached at which no compaction occurs, i.e. about 1.5 feet per second. Low roll speeds, materially below 0.5 foot per second, reduce the output of the compacting rolls without correspondingly increasing the degree of compaction of the dye.

The surfaces of the compacting rolls should be maintained at a temperature of from about −10° C. to 30° C. during compaction of the dye of this invention. A temperature of 30° C. must not be exceeded if the dye is to be rendered satisfactorily dustless and free-flowing and the process is to operate efficiently. Temperatures materially below −10° C. have no adverse effects but are unnecessary and are uneconomical to maintain. A convenient and preferred working range of roll surface temperatures is from about 10° C. to about 30° C. In order to maintain the rolls at the desired temperature, they must be hollow and provided with means for circulating a cooling fluid through their interiors. Such means are conventional and well known to the art.

The compacting rolls should subject the dye powder to a compacting pressure between 1,000 and 50,000 lbs. per square inch (p.s.i.). Compaction pressures outside these ranges must not be used if the dye is to be compacted and rendered satisfactorily dustless and free-flowing, soluble in the gasoline at acceptable rates, and the process is to operate efficiently. The rate of solution of the compacted dye is dependent upon the compaction pressure, and decreases with increase in such pressure. Compaction pressures above 50,000 p.s.i. reduce the rate of solution of the dye to an unacceptable rate. Usually, the compaction pressure will be from about 2,000 to about 28,500 lbs. per square inch, and preferably from about 2,000 to about 10,000 lbs. per square inch, in order to produce a product having the maximum rate of solution.

In order to have a practically acceptable rate of solution in gasoline, at least 90% of a 200 mg. portion of the compacted dye should dissolve in 200 ml. of a standard synthetic gasoline at 27° C. within 1400 seconds; employing as a standard, a synthetic gasoline which is composed of 30% by weight of diisobutylene, 25% by weight of isooctane, 25% by weight of cyclohexane and 20% by weight of toluene. Usually, it is desired that the compacted dye have such a rate of solution of within 800 seconds, preferably within 500 seconds.

The rate of solution of the compacted dye is determined conveniently as follows. Four 200 mg. (±0.2 mg.) portions of the dye are weighed into weighing dishes. Four 200 ml. portions of the standard synthetic gasoline are poured into separate 250 ml. bottles, the bottles placed in a water bath at 27° C.±0.1° C., and the gasoline stirred with a magnetic stirrer. When the gasoline reaches the temperature of the water bath, the weighed dye samples are transferred to the bottles and the timer started. At the end of a selected stirring time, the stirrer is stopped, and a filter tube is lowered into the dye solution. From the filter tube, one milliliter of the filtered solution is taken in a bulb pipette and transferred to a 100 ml. volumetric flask containing about 30 ml. of the synthetic gasoline and shaken until the color becomes uniform. The percent strength of the dye solution is then calculated by relating its percent light transmission in a photometer with the percent light transmission of a solution of the same dye obtained by completely dissolving 100 mg. of the dye, in powder form before compaction, in 100 ml. of benzene. The analysis is repeated at later intervals and, from a plot of the percent of the dye in solution versus time, the time for 90% solution is read and recorded.

The compacted dye, obtained from the compacting rolls, normally is in the form of flakes larger than 8 mesh in size admixed with a small proportion of uncompacted powder. The uncompacted powder usually is screened from the flakes and the flakes are broken up or comminuted to particles of sizes predominantly in the range of 10 to 100 mesh. The comminuted material is screened to separate those particles in the size range of from 10 to 100 mesh, preferably from 14 to 60 mesh. Insufficiently comminuted material will then be comminuted further, and the material of smaller particle size will be returned to the compacting process.

Figure 1:
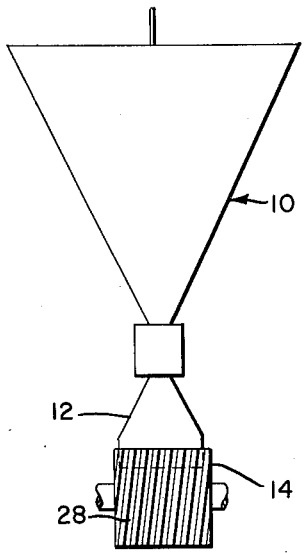
Figure 3:
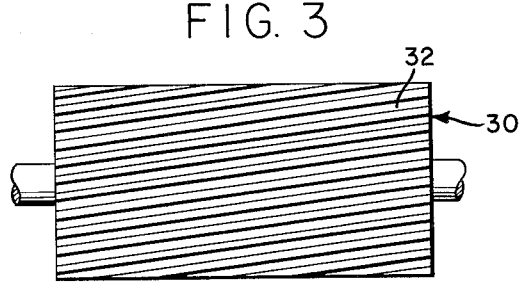

A preferred form of equipment suitable for the practice of this invention is illustrated in the accompanying drawings in which FIGURE 1 is a front view of a feeder and compacting rolls, FIGURE 2 is a side view in cross section of the equipment of FIGURE 1, and FIGURE 3 is a front view of an alternative form of corrugated roll.

Referring first to FIGURES 1 and 2, the equipment comprises a commercial feeder provided with a nozzle 12 and a pair of corrugated compacting rolls 14 and 16. The feeder includes a conical stainless steel hopper 10 which is 18 inches high with a diameter of 18 inches at the top and tapering to a diameter of 1¾ inches at the bottom, and which has a lower cylindrical portion 18 about 4 inches long and 1¾ inches in diameter. A rotatable shaft 20 passes down through the center of the hopper and is fitted at its lower end with a tapered feed screw 22 which extends from above the bottom of the hopper to the bottom of the cylindrical portion 18. The shaft 20 also carries an agitator 24 which is positioned a short distance above the feed screw 22 and operates close to the wall of the hopper 10.

The nozzle 12 is attached to the lower end of the cylindrical portion 18 and is about 5.5 inches high. It has a diameter of 1¾ inches at the top and flares to a 2 by 6 inch rectangular opening at the bottom with tapered extensions 26 at each end. The nozzle is positioned over the nip of the compaction rolls 14 and 16 with the longer dimension of the opening parallel with the nip and so that its lower edge clears the surfaces of the rolls by about ⅛ inch.

The compacting rolls are motor-driven, stainless steel, hollow rolls, 6 inches long and 6 inches in diameter, which are mounted close together with their axes parallel in the same horizontal plane and rotate toward the nip as indicated by the arrows. As shown, the rolls are provided with continuous spiral channels 28 which are about 3/16 inch wide, about ⅛ inch deep and about 3/16 inch apart. The channel extend spirally about the circumference of the rolls similar to a screw thread and are so arranged that those of each roll mesh with those of the other, the channels of one roll corresponding to a right-hand thread and those on the other roll corresponding to a left-hand thread. The channels, instead of being in the form of a continuous spiral, can be in the form of a plurality of separate parallel channels, of which encircles the circumference of the roll in a plane perpendicular to the axis of the roll, those on one roll being displaced longitudinally from those on the other roll so that the lands on each roll will enter the channels of the other roll.

The rolls are further provided with conventional means (not shown) for circulating a cooling fluid, such as cold water or brine, through their interiors and with conventional means (not shown), such as an air-actuated hydraulic system, for forcing them toward each other and adjusting and controlling the compaction pressure.

The specific structures of the feeder and of the corrugated rolls shown in FIGURES 1 and 2 and hereinbefore described do not form any part of this invention but constitute the inventions or discoveries of others.

FIGURE 3 represents another, less preferred, alternative form of roll. This roll 30 has a diameter of 6 inches and a length of 12 inches. In this case, as shown, the channels 32 extend substantially longitudinally, at an angle of about 7.5° from a line parallel to the axis of the roll, there being about 8 channels per inch of the circumference of the roll. Otherwise, this roll is similar to the rolls of FIGURES 1 and 2, i.e. is hollow and provided with means for circulating a cooling fluid through it and being similarly mounted. With rolls of this length, the opening in the nozzle of the feeder will be correspondingly increased in its longer dimension.

Preferably, both rolls will be provided with meshing circumferentially extending channels or corrugations which may vary considerably in number, size and shape from those shown in the drawings and described in connection therewith. However, good results have been obtained with rolls having longitudinally extending corrugations or channels, with a pair of smooth rolls, and with the combination of one corrugated roll and one smooth roll.

In operation, the hopper 10 will be filled with the dye to be compacted, the compacting rolls 14 and 16 forced toward each other so as to provide the desired compaction pressure, and a cooling fluid circulated through the rolls to bring them to the desired temperature and to maintain them within the required range of temperatures. The screw feeder 22 will be operated at a speed, related to the speed of rotation of the rolls, to feed the dye to the nip of the rolls at a rate equal to that at which the dye passes through the rolls. The screw feeder 22 also acts to compress the dye, removing air admixed with the dye and reducing the bulk volume of the dye, and to force the compressed dye into the nip of the rolls. The flared nozzle 12 permits the dye to be distributed over substantially the length of the nip of the rolls and, due to its positioning close to the nip, maintains the dye in its compressed and deaerated condition until it reaches the nip of the rolls. It will be understood that the dye in the hopper 10 will be replenished as required for prolonged continuous operation of the equipment.

In order to more clearly illustrate this invention, preferred modes of carrying it into effect, and advantageous results to be obtained thereby, the following examples are given, in which the amounts and proportions are by weight except where specifically indicated otherwise.

*Example 1*

The apparatus disclosed in FIGURES 1 and 2 and hereinbefore described in detail was used. The dye employed was that made by the partial diazotization of a mixture of 77.2 parts of aniline, 88.8 parts of o-toluidine, and 100.4 parts of mixed xylidines to form mixed arylazoaryl amines which were diazotized and coupled with 165 parts of 2-naphthol according to the process described in Example I of Patent 2,087,282.

Before running the process, the pressure of the compaction rolls was adjusted to give 1400 pounds thrust on the rolls and a compaction pressure of a little less than 10,000 p.s.i. Water, at a temperature of 0° C. to 5° C., was circulated through the rolls. With the compactor rolls turning at 28 r.p.m., the dye powder was fed through the hopper with the rotation of the tapered screw regulated to feed the dye powder to the rolls as fast as it passed through the rolls. With the equipment described and so operated, about 360 lbs. of dye per hour were processed. The material from the rolls was screened through an 8 mesh screen and the coarse compacted material was then comminuted. The comminuted material was screened to separate out the particles having sizes in the range of 14 to 60 mesh.

The separated material of 14 to 60 mesh size was a free-flowing, non-dusting product of which 90% of a 200 mg. portion dissolved in 200 ml. of the standard synthetic gasoline in 500 seconds. The non-dusting property of the compacted material was in sharp contrast with the dustiness of the starting dye powder. For example, the original dye powder, when shaken in a ¼-filled widemouth jar, at once coated the walls of the jar and the dust within the space in the jar was slow to settle. On the other hand, the compacted dye product of this example, when similarly shaken in a jar, behaved like table salt or granulated sugar; no or very little material adhered to the walls of the jar and the granular dye particles settled as soon as shaking ceased, with little or no traces of dust in the air over the solid.

*Example 2*

This series of experiments illustrate the effect of roll temperature, compacting pressure, roll speed, and forced feed on the quality of the product and operation of the process.

(a) *Effect of temperature.*—The powdery dye used in Example 1 was passed through a set of two rolls, 6" diameter by 12" wide, one of which was smooth and one was corrugated lengthwise as shown in FIGURE 3 of the drawings. The rolls were not cooled, but were allowed to warm up by the heat of compaction or compression. The starting temperature at the surface of the smooth roll was 32° C. In four minutes, the dye began to stick to the roll and the surface temperature was 37° C. In a repeat performance (after cleaning the rolls), with cooling water at 20° C. circulating through the rolls and with a starting roll surface temperature of 27° C., the dye ran through the rolls for 10 minutes before sticking occurred, and the roll temperature had increased to 40° C. With brine at −10° C. circulating through the rolls, no sticking occurred with prolonged (8 hours and over) continuous passage of dye through the rolls set the same as when operated without the cooling brine.

(b) *Effect of compacting pressure.*—The gasoline dye described in Example 1 was compacted under static conditions of known applied pressure at room temperature. This was done by compressing the dye in a 1¼" diameter cavity mold between the plates of a hydraulic press. The resulting wafers were crumbled and screened through a 20-mesh sieve placed over a 60-mesh sieve. Portions of the material, having a particle size between 20 mesh and 60 mesh, were added to the standard synthetic gasoline composed of 30% diisobutylene, 25% isooctane, 25% cyclohexane and 20% toluene and the rate of solution observed. The results were:

| Compaction pressure, p.s.i. | Time, in seconds, for 90% of 200 mg. of material to dissolve in 200 ml. of gasoline at 27° C. |
| --- | --- |
| 4,080 | 110 |
| 8,150 | 335 |
| 12,200 | 580 |
| 20,400 | 700 |
| 28,500 | 750 |

These data show that compaction pressures of 4,080 to 28,500 p.s.i. increase the density of the dye so that 90% of it dissolves at 27° C. in the synthetic gasoline in 750 seconds or less which is well below the limit of 1400 seconds.

(c) *Compaction roll speed.*—On passage of the dye of Example 1 through the forced feeder and the compactor rolls, with the rolls having a peripheral speed of 1.5 feet per second, little or no compaction occurred. When the peripheral speed of the rolls was reduced to 0.73 foot per second, 330 pounds of dye per hour were 80% to 90% compacted. On a set of smooth rolls 18" in diameter and 6" wide, compaction was attained at a peripheral speed of 0.16 foot per second but not at 2.0 feet per second.

(d) *Effect of forced feed.*—Delivery of the compressed powdered dye of Example 1 into the nip of the compactor rolls through the forced feeder was necessary to attain compaction. When the dye was allowed to flow from a scoop or to drop through the air into the nip of the rolls, no compaction occurred. When the dye was deaerated by passage through a screw type feeder and then allowed to fall freely and mix again with the air for a distance of over one inch before it reached the nip of the rolls, little or no compaction occurred.

It will be understood that the preceding examples and drawings are given for illustrative purposes solely and that this invention is not limited to the specific embodiments described therein. On the other hand, it will be apparent to those skilled in the art that many variations and modifications can be made in the procedures, conditions, and equipment employed, within the limitations set forth in the general description, without departing from the spirit or scope of this invention.

From the preceding description it will be apparent that this invention provides a novel process for converting the particular dye to non-dusting, free-flowing particles which have an acceptable high rate of solution in gasoline, thereby solving a serious problem in the art. The process is simple, economical, and easily operated and controlled. The resulting compacted dye has a combination of novel, beneficial properties whereby it is more easily transported, handled, and used for coloring gasoline without the disadvantages and hazards previously encountered with dyes of this character. Therefore, it is apparent that this invention constitutes a valuable advance in, and contribution to, the art.

The embodiments of the invention in which an exclusive property or privilege is claimed are defined as follows:

1. The process for the manufacture of non-dusting, free-flowing, gasoline-soluble particles of a dye which consists of a mixture of disazo compounds of the formula

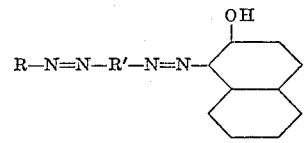

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises compressing the dry dye powder to deaerate it and reduce its bulk volume, feeding said dye powder in its compressed and deaerated form into the nip of a pair of compacting rolls which are rotated at a peripheral speed of 0.5 to 1 foot per second, and passing the dye powder between said compacting rolls while subjecting it to a compacting pressure between 1,000 and 50,000 p.s.i. and while maintaining the surfaces of the rolls at a temperature of from about −10° C. to 30° C.

2. The process for the manufacture of non-dusting, free-flowing, gasoline-soluble particles of a dye which consists of a mixture of disazo compounds of the formula

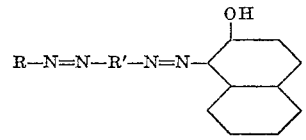

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises compressing the dry dye powder to deaerate it and reduce its bulk volume, feeding said dye powder in its compressed and deaerated form into the nip of a pair of compacting rolls which are rotated at a peripheral speed of 0.5 to 1 foot per second, and passing the dye powder between said compacting rolls while subjecting it to a compacting pressure of from about 2,000 to about 28,500 p.s.i. and while maintaining the surfaces of the rolls at a temperature of from about −10° C. to 30° C.

3. The process for the manufacture of non-dusting, free-flowing, gasoline-soluble particles of a dye which consists of a mixture of disazo compounds of the formula

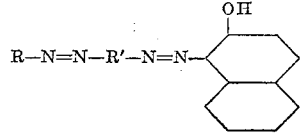

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises compressing the dry dye powder to deaerate it and reduce its bulk volume, feeding said dye powder in its compressed and deaerated form into the nip of a pair of compacting rolls which are rotated at a peripheral speed of 0.5 to 1 foot per second, and passing the dye powder between said compacting rolls while subjecting it to a compacting pressure of from about 2,000 to about 10,000 p.s.i. and while maintaining the surfaces of the rolls at a temperature of from about −10° C. to 30° C.

4. The process for the manufacture of non-dusting, free-flowing, gasoline-soluble particles of a dye which consists of a mixture of disazo compounds of the formula

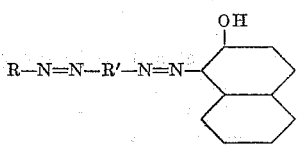

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises compressing the dry dye powder to deaerate it and reduce its bulk volume, feeding said dye powder in its compressed and deaerated form into the nip of a pair of compacting rolls which are rotated at a peripheral speed of 0.5 to 1 foot per second, passing the dye powder between said compacting rolls while subjecting it to a compacting pressure between 1,000 and 50,000 p.s.i. and while maintaining the surfaces of the rolls at a temperature of from about −10° C. to 30° C., comminuting the compacted dye to particles which predominate in particles of sizes in the range of 10 to 100 mesh, and separating from the comminuted material those particles which have a size between 10 and 100 mesh.

5. The process for the manufacture of non-dusting, free-flowing, gasoline-soluble particles of a dye which consists of a mixture of disazo compounds of the formula

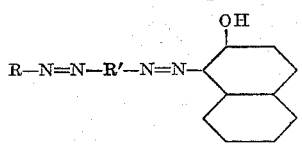

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises feeding the dry dye powder through a forced feed mechanism which exerts a mechanical compressing force upon the dye powder to deaerate the dye powder and which forces the deaerated dye powder into the nip of a pair of compacting rolls which are rotated at a peripheral speed of 0.5 to 1 foot per second, and passing the dye powder between said compacting rolls while subjecting it to a compacting pressure between 1,000 and 50,000 p.s.i. and while maintaining the surfaces of the rolls at a temperature of from about −10° C. to 30° C.

6. The process for the manufacture of non-dusting, free-flowing, gasoline-soluble particles of a dye which consists of a mixture of disazo compounds of the formula

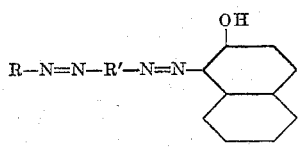

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises feeding the dry dye powder through a forced feed mechanism which exerts a mechanical compressing force upon the dye powder to deaerate the dye powder and which forces the deaerated dye powder directly into the nip of a pair of compacting rolls which are rotated at a peripheral speed of 0.5 to 1 foot per second, and passing the dye powder between said compacting rolls while subjecting it to a compacting pressure of from about 2,000 to about 28,500 p.s.i. and while maintaining the surfaces of the rolls at a temperature of from about −10° C. to 30° C.

7. The process for the manufacture of non-dusting, free-flowing, gasoline-soluble particles of a dye which consists of a mixture of disazo compounds of the formula

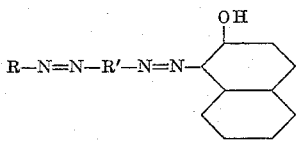

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises feeding the dry dye powder through a forced feed mechanism which exerts a mechanical compressing force upon the dye powder to deaerate the dye powder and which forces the deaerated dye powder directly into the nip of a pair of meshing, circumferentially corrugated compacting rolls which are rotated at a peripheral speed of 0.5 to 1 foot per second, and passing the dye powder between said compacting rolls while subjecting it to a compacting pressure of from about 2,000 to about 25,800 p.s.i. and while maintaining the surfaces of the rolls at a temperature of from about −10° C. to 30° C.

8. The process for the manufacture of non-dusting, free-flowing, gasoline-soluble particles of a dye which consists of a mixture of disazo compounds of the formula

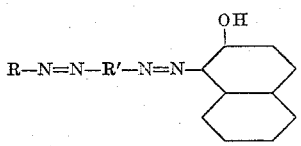

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises feeding the dry dye powder downward through a screw feed mechanism which compresses and deaerates the dye powder and forces the compressed and deaerated dye powder into the nip of a pair of compacting rolls which are rotated at a peripheral speed of 0.5 to 1 foot per second, and passing the dye powder between said compacting rolls while subjecting it to a compacting pressure of from about 2,000 to about 28,500 p.s.i. and while maintaining the surfaces of the rolls at a temperature of from about −10° C. to 30° C.

9. The process for the manufacture of non-dusting, free-flowing, gasoline-soluble particles of a dye which consists of a mixture of disazo compounds of the formula

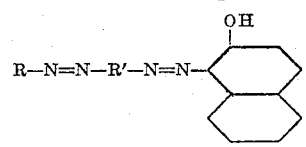

wherein R represents a member of the group consisting of phenyl, o-tolyl and xylyl radicals and R' represents a member of the group consisting of p-phenylene, methyl-p-phenylene, di-methyl-o-phenylene and di-methyl-p-phenylene radicals and which is normally in the form of a finely-divided bulky aerated powder, which process comprises feeding the dry dye powder downward through a screw feed mechanism which compresses and deaerates the dye powder and forces the compressed and deaerated dye powder into the nip of a pair of meshing, circumferentially corrugated compaction rolls which are rotated at a peripheral speed of 0.5 to 1 foot per second, and passing the dye powder between said compacting rolls while subjecting it to a compacting pressure of from about 2,000 to about 28,500 p.s.i. and while maintaining the surfaces of the rolls at a temperature of from about −10° C. to 30° C.

10. The process for the manufacture of non-dusting, free-flowing, gasoline-soluble particles of a dye which consists of a mixture of disazo compounds of the formula

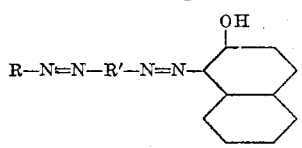

wherein R represents a member of the group consisting of phenyl, o-tolyl and xylyl radicals and R′ represents a member of the group consisting of p-phenylene, methyl-p-phenylene, di-methyl-o-phenylene and di-methyl-p-phenylene radicals and which is normally in the form of a finely-divided bulky aerated powder, which process comprises feeding the dry dye powder downward through a screw feed mechanism which compresses and deaerates the dye powder and forces the compressed and deaerated dye powder into the nip of a pair of meshing, circumferentially corrugated compaction rolls which are rotated at a peripheral speed of 0.5 to 1 foot per second, passing the dye powder between said compacting rolls while subjecting it to a compacting pressure of from about 2,000 to about 28,500 p.s.i. and while maintaining the surfaces of the rolls at a temperature of from about −10° C. to 30° C., comminuting the compacted dye to particles which predominate in particles of sizes in the range of 10 to 100 mesh, and separating from the comminuted material those particles which have a size between 10 and 100 mesh.

11. A dye which consists of a mixture of disazo compounds of the formula

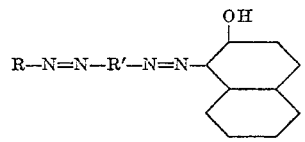

wherein R represents a member of the group consisting of phenyl, o-tolyl and xylyl radicals and R′ represents a member of the group consisting of p-phenylene, methyl-p-phenylene, di-methyl-o-phenylene and di-methyl-p-phenylene radicals which dye is in the form of non-dusting, free-flowing, compacted particles which have a particle size of between 10 and 100 mesh and which have a rate of solution in gasoline of at least 90% of a 200 mg. portion in 200 ml. of gasoline at 27° C. within 1400 seconds.

References Cited in the file of this patent
UNITED STATES PATENTS

| | | |
|---|---|---|
| 1,098,651 | Washburn | June 2, 1914 |
| 2,087,282 | Friedrich et al. | July 20, 1937 |
| 2,098,798 | Thornton | Nov. 9, 1937 |
| 2,326,777 | Guth | Aug. 17, 1943 |
| 2,363,876 | La Lande | Nov. 28, 1944 |

FOREIGN PATENTS

| | | |
|---|---|---|
| 505,940 | Canada | Sept. 21, 1954 |
| 725,973 | Great Britain | Mar. 16, 1955 |